United States Patent
Hayashi et al.

[11] Patent Number: 6,069,859
[45] Date of Patent: May 30, 2000

[54] POLARIZATION SEPARATING ELEMENT HAVING PARTIALLY POLARIZING PROPERTIES FOR DIFFRACTING AN ORDINARY LIGHT BEAM AND A PROCESS FOR PRODUCING THE SAME

[75] Inventors: Kenichi Hayashi; Kazuo Kobayashi, both of Nagano, Japan

[73] Assignee: Kabushiki Kaisha Sankyo Seiki Seisakusho, Nagano, Japan

[21] Appl. No.: 09/245,069

[22] Filed: Feb. 5, 1999

[30] Foreign Application Priority Data

Feb. 9, 1998 [JP] Japan ................................. 10-026822

[51] Int. Cl.[7] .................. G02B 5/30; G11B 7/00
[52] U.S. Cl. .................. 369/109; 369/103; 369/110; 369/112
[58] Field of Search .................. 369/112, 109, 369/116, 103, 44.12, 44.23, 110; 359/495, 576; 117/5, 59, 63, 902, 919; 385/129, 130, 132

[56] References Cited

U.S. PATENT DOCUMENTS

| | | |
|---|---|---|
| 4,665,310 | 5/1987 | Heemskerk .................. 369/44.12 |
| 4,885,734 | 12/1989 | Yuzo ....................... 369/44.23 |
| 5,224,197 | 6/1993 | Zanoni et al. .................. 385/130 |
| 5,385,116 | 1/1995 | Hattori et al. .................. 117/5 |
| 5,410,529 | 4/1995 | Kurata et al. .................. 369/109 |
| 5,739,952 | 4/1998 | Takeda et al. .................. 359/495 |
| 5,793,733 | 8/1998 | Takeda et al. .................. 369/112 |
| 5,822,293 | 10/1998 | Lee et al. .................. 369/112 |

*Primary Examiner*—Tan Dinh
*Assistant Examiner*—Kim-Kwok Chu
*Attorney, Agent, or Firm*—Sughrue, Mion, Zinn, Macpeak & Seas, PLLC

[57] ABSTRACT

A polarization separating element 1 is produced by forming a polydiacetylene derivative film 11 on the surface 101 of a glass substrate 10 as an optically isotropic substrate, and selectively irradiating the polydiacetylene derivative film 11 with ultraviolet rays to form a grating 12 which has periodic grooves and two hues and exhibits partially polarizing properties. In a light pickup device containing the polarization separating element 1 having partially polarizing properties, part of the light reflected on an optical disk reaches a receptor without fail even if the optical disk has birefringence, whereby the recorded information can be reproduced with no problem.

12 Claims, 4 Drawing Sheets

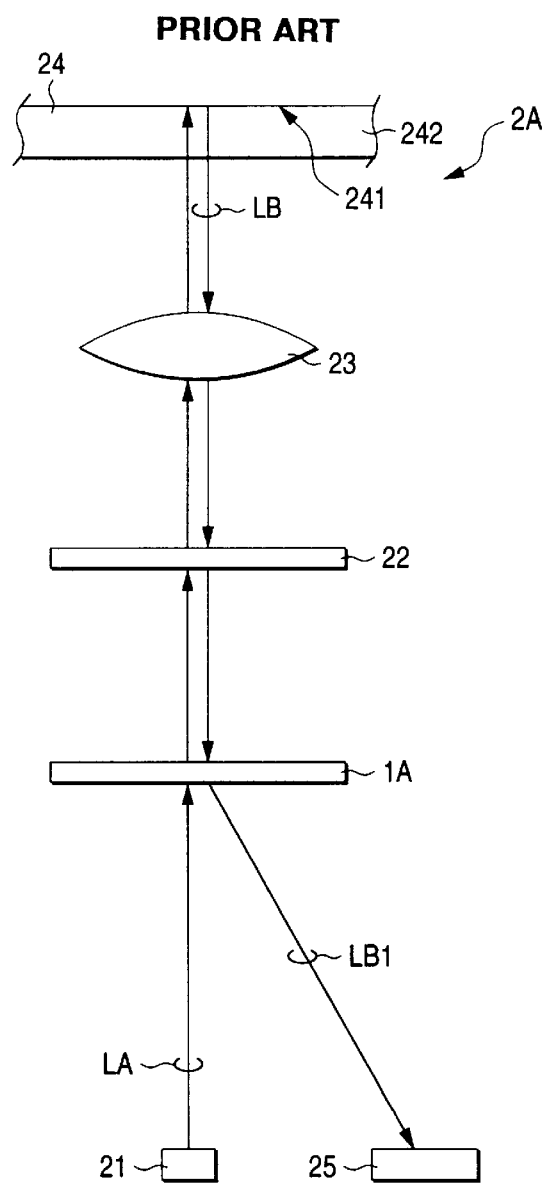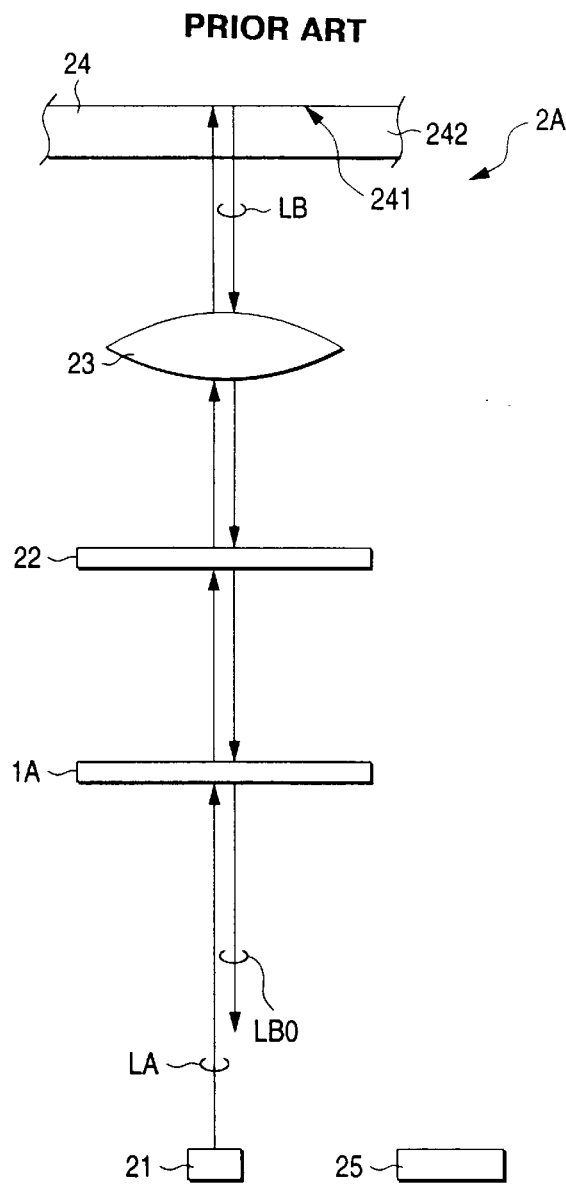
FIG. 5A PRIOR ART
FIG. 5B PRIOR ART

POLARIZATION SEPARATING ELEMENT HAVING PARTIALLY POLARIZING PROPERTIES FOR DIFFRACTING AN ORDINARY LIGHT BEAM AND A PROCESS FOR PRODUCING THE SAME

BACKGROUND OF THE INVENTION

1. Field of the Invention

This invention relates to a polarization separating element in use of a kind of optical device and a manufacturing method thereof.

2. Related Art

A light pickup device used for recording and reproduction of optical or optomagnetic recording disks such as CD, DVD and MO (hereinafter simply referred to as optical disks) includes one shown in FIG. 5A. In the light pickup device 2A of FIG. 5 laser light LA emitted from a laser light source 21 passes through a polarization separating element 1A, a quarter-wave plate 22 and an objective lens 23 and is condensed on the recording surface 241 of an optical disk 24, and reflected light LB again passes through the objective lens 23, the quarter-wave plate 22 and the polarization separating element 1A, and reaches an receptor 25.

The polarization separating element 1A used in the light pickup device 2A is generally designed to diffract all the light rays except either ordinary rays or extraordinary rays so as to obtain greater utilization of laser power. Such diffraction characteristics will hereinafter be referred to as perfectly polarizing properties. For example, where the polarization separating element 1A is designed not to diffract ordinary rays but extraordinary rays, the laser light LA from the laser light source 21 is not diffracted as ordinary light. On the other hand, the reflected light LB from the optical disk 24 has been converted to extraordinary light while passing through the quarter-wave plate 22 by the time when it again enters the polarization separating element 1A. Therefore the light LB is diffracted by the polarization separating element 1A and reaches the receptor 25 as diffracted light of first order LB1. Where such a polarization separating element 1A having perfectly polarizing properties (hereinafter referred to as perfect polarization separating element) is used, all the laser rays LA emitted from the laser light source 21 are condensed on the recording surface 241 of the optical disk 24, and the theoretical maximum of the diffracted light of first order of the reflected light LB reaches the receptor 25, thereby to enjoy greater efficiency of laser power.

However, there are cases in which a substrate 242 of the optical disk 24, through which light should pass before reaching the recording surface 242, exhibits large birefringence. Such an optical disk involves a fear that the reflected light LB may not reach the receptor 25. For example, if the substrate 242 of the optical disk 24 acts like a halfwave plate on account of its birefringence, both the laser light LA emitted from the laser light source 21 and the reflected light LB are ordinary rays. In this case, as shown in FIG. 5B, the reflected light LB passes through the polarization separating element 1A without being diffracted and fails to reach the receptor 25.

The inventors of the present invention now propose use of a polarization separating element which is capable of generating diffracted light rays from both ordinary rays and extraordinary rays in a light pickup device in place of the customarily used perfect polarization separating element 1A. Such diffraction characteristics of the polarization separating element of the invention will hereinafter be referred to as partially polarizing properties.

A polarization separating element having partially polarizing properties (hereinafter referred to as partial polarization separating element) can be prepared in the same manner as for perfect polarization separating element by using lithium niobate. For example, a single crystal of lithium niobate is subjected to periodic proton exchange to form a periodic grating, and an optically isotropic transparent film of $SiO_2$, etc. is formed on the proton-exchanged area of the periodic grating to obtain a partial polarization separating element. However, a partial polarization separating element obtained from lithium niobate in a conventional process is very expensive for the following reasons. (1) A special apparatus is required for forming a single crystal of lithium niobate, and production of a polarization separating element from the single crystal involves extremely laborious steps. (2) Lithium niobate is brittle and easily broken during handling, resulting in poor yield. (3) The material cost of lithium niobate itself is high.

SUMMARY OF INVENTION

Accordingly, an object of the present invention is to provide a partial polarization separating element which can be produced easily and economically without using special equipment and a process for producing the same.

The object of the invention is accomplished by a polarization separating element having an optically isotropic substrate and a thin film comprising a polydiacetylene derivative which is formed on at least one of the light incident surface and the light emergence surface of the optically isotropic substrate, wherein a grating formed on said thin film, the grating having periodic grooves and two hues, the grating being capable of generating at least diffracted light of first order from either incident ordinary rays or incident extraordinary rays and generating both diffracted light of zero order and diffracted light of first order from the other incident rays.

In the present invention, a polydiacetylene derivative is used to form a partial polarization separating element. A thin film of a polydiacetylene derivative is prepared easily by vacuum evaporation followed by ultraviolet polymerization, and the like. Therefore, the polarization separating element of the invention can be produced more easily and economically than the conventional process using lithium niobate. Because a film of a polydiacetylene derivative exhibits large birefringence, a small thickness suffices for securing desired polarizing properties, which is advantageous for preparing a compact polarization separating element. A thin film of the polydiacetylene derivative can be formed with planar uniformity simply by vacuum evaporation and ultraviolet polymerization, which is advantageous for producing a composite element combined with a prism, a mirror, etc.

The periodic grooves making the grating are formed by selectively irradiating a thin film of a polydiacetylene derivative with ultraviolet rays. As a result of various experiments on characteristics and physical properties of polydiacetylene derivatives, the inventors have found that a thin film of a polydiacetylene derivative changes its refractive index and physically shrinks to form concavities on being selectively irradiated with ultraviolet rays. Selective UV irradiation of a thin film comprising a polydiacetylene derivative provides a periodic grating having a fine uneven pattern composed of concavities (grooves) and convemergenceies with ease and high precision as compared with other techniques such as etching.

Where the polarization separating element of the invention is used as a beam splitter of a polarization-dependent light pickup device, it is preferred that the grating be designed to generate maximum diffracted light of first order from either incident rays. In the polarization-dependent light pickup device using so designed polarization separating element as a beam splitter, the amount of light entering a receptor can be maximized in case where laser light has not been influenced by the birefringence of an optical disk.

Where the polarization separating element of the invention is used as a beam splitter of a polarization-dependent light pickup device, it is preferred that the grating be designed to generate diffracted light of first order from one of ordinary rays and extraordinary rays at a diffraction intensity ratio of 0.5 to diffracted light of zero order and to generate diffracted light of first order from the other incident rays at a diffraction intensity of 0.5 or higher to diffracted light of zero order. In the polarization-dependent light pickup device using so designed polarization separating element as a beam splitter, the amount of light entering a receptor increases in case where the laser light has been influenced by the birefringence of an optical disk. As a result, the laser power utilization efficiency is improved as compared with a conventional polarization-independent light pickup device in case that an optical disk shows birefringence.

The thin film forming the periodically grooved grating can have provided thereon an antireflective coating or a protective coating for protecting the thin film from mechanical damage. It is preferable for the thin film to have a surface coating having an antireflective function combined with a protective function. The antireflective function reduces an optical loss caused by the polarization separating element, and the protective function surely protects the polydiacetylene derivative thin film having low mechanical strength, thereby to improve reliability of the polarization separating element.

The present invention also provides a process for producing the above-described polarization separating element, which comprises depositing a diacetylene monomer by vacuum evaporation on at least one of the light incident surface and the light emergence surface of an optically isotropic substrate, irradiating the diacetylene monomer with ultraviolet rays to cause the diacetylene monomer to polymerize to form a thin film, and selectively irradiating the thin film with ultraviolet rays to form the above-described grating.

A polymer film comprising a polydiacetylene derivative can be formed simply by irradiating a diacetylene monomer deposited on an optically isotropic substrate with ultraviolet rays, and periodic grooves can be made in the polymer film simply by selective irradiation with ultraviolet rays. As compared with etching or other like techniques, a periodic grating can be formed at a smaller pitch without requiring any special equipment. Thus, a polarization separating element having partially polarizing properties can be produced easily and economically.

Before a diacetylene monomer is deposited by vacuum evaporation, it is preferable that an orientation film be formed by rubbing treatment on at least one of the light incident surface and the light emergence surface of the optically isotropic substrate, on which a diacetylene monomer is to be deposited. In this case, on being deposited on the orientation film, the diacetylene monomer orientates spontaneously along the rubbing direction of the orientation film.

BRIEF DESCRIPTION OF THE DRAWINGS

FIGS. 5A and 5B are schematic views of a light pickup device in which a conventional polarization separating element having perfectly polarizing properties is used as a beam splitter;

DETAILED DESCRIPTION OF PREFERRED EMBODIMENTS

Figure 1:
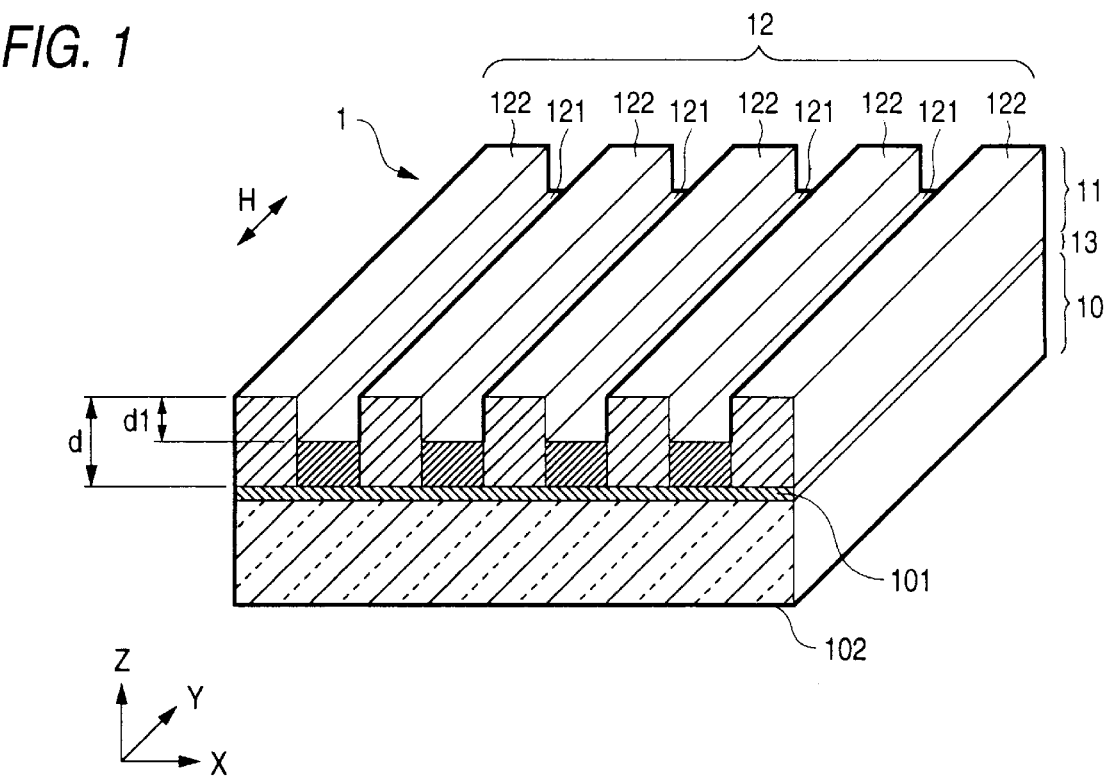
FIG. 1 is a schematic view of the polarization separating element according to the present invention.

Preferred embodiments of the present invention will now be illustrated with reference to accompanying drawings.
Construction of Polarization Separating Element In FIG. 1 is shown a schematic view of a polarization separating element according to the invention. The polarization separating element 1 according to the embodiment shown in FIG. 1 comprises a glass substrate 10 (optically isotropic substrate) having a light incident surface 101 and a light emergence surface 102, and a polydiacetylene derivative film 11 (a thin film comprising a polydiacetylene derivative) having a prescribed thickness which is formed on the surface 101 of the glass substrate 10. The polydiacetylene derivative film 11 has been selectively irradiated with ultraviolet rays to form a periodically grooved grating 12. The polarization separating element 1 also has an orientation film 13 comprising polyethylene terephthalate (PET) on the surface 101 of the glass substrate 10, i.e., beneath the polydiacetylene derivative film 11.

The polydiacetylene derivative film 11 comprises a polydiacetylene derivative represented by formula (1):

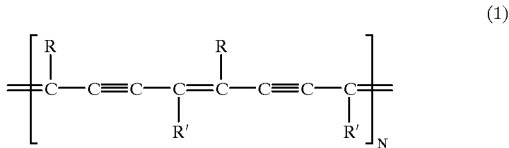

(1)

The side chains R and R' in formula (I) are shown below together with their trivial name.

(2) CmUCn $$(CH_2)_mOCONHC_nH_{2n+1} \tag{2}$$

(3) PTS

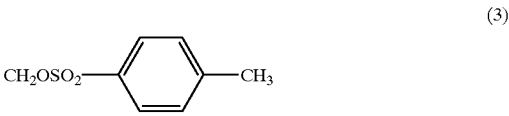

(3)

(4) PTS-12

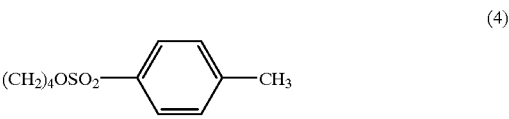

(4)

(5) DCHD

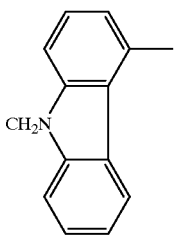
(5)

(6) HDU

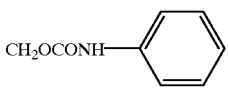
(6)

(7) DFMDP

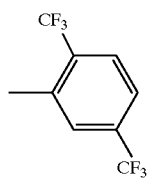
(7)

(8) TCDU

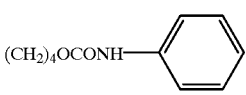
(8)

(9) nBCMU

$(CH_2)_n OCONHCH_2 COOC_4H_9$ (9)

All the polydiacetylene derivatives shown above are obtainable by polymerizing the corresponding diacetylene monomer.

The polydiacetylene derivative molecules in the film 11 are orientated in the X-Y plane, with their main chain being in the direction of the Y axis indicated by left and right arrow H.

On being irradiated with ultraviolet rays, the molecular chain of the polydiacetylene derivative is severed to cause change in hue in the order of blue, red, and transparency or in the order of red and transparency. The refractive index of the film 11 in the direction H decreases with this change in hue. At the same time, the irradiated area of the polydiacetylene derivative film 11 shrinks to form grooves 121.

Taking advantage of the above characteristics, the polydiacetylene derivative film 11 has a pattern designed to change the refractive index periodically in the direction of orientation. That is, on being selectively irradiated with ultraviolet rays, the irradiated area of the polydiacetylene derivative film 11 undergoes hue change and shrinkage to a prescribed depth to form grooves 121 while the non-irradiated area remains unchanged in refractive index and thickness to form projections 122. There is thus formed a periodic grating 12 made up of the grooves 121 and the projections 122.

Figure 2:
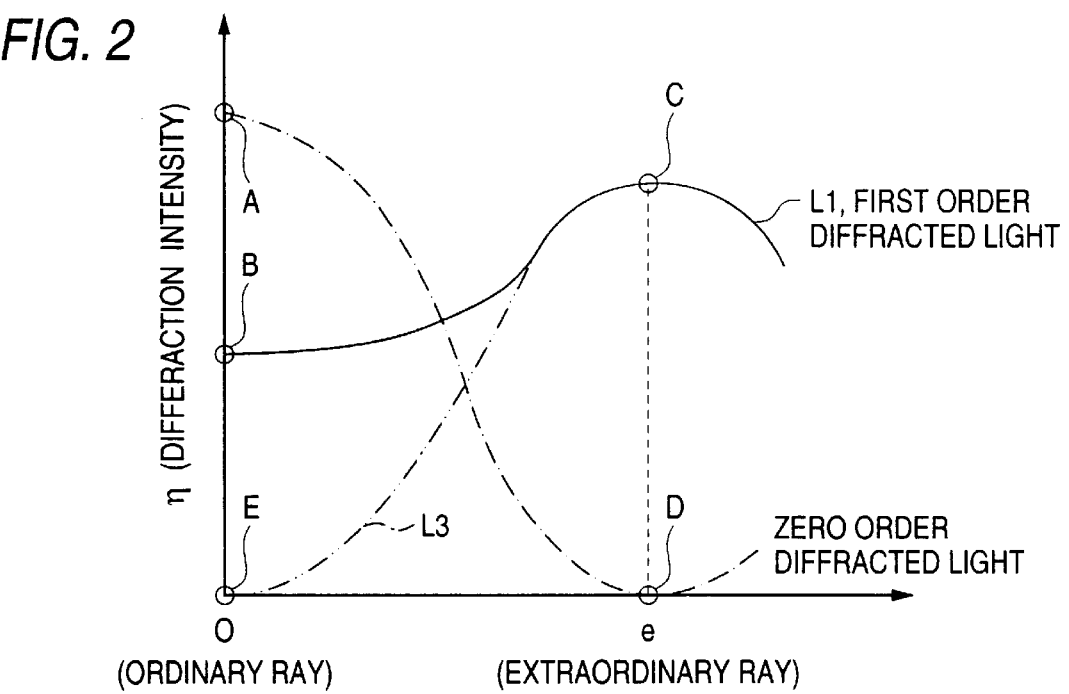
FIG. 2 is a graph showing the diffraction characteristics of the polarization separating element of FIG. 1.

FIG. 2 shows the optical characteristics of the grating 12, in which the intensity of diffracted light of first order from ordinary rays or extraordinary rays is shown by a solid line L1, and that of diffracted light of zero order is shown by a single-dotted line L2. As shown in FIG. 2, the polarization separating element 1 exhibits partially polarizing properties in such a manner that extraordinary rays polarized in the direction H (the orientation direction of the film 11) generate diffracted light of first order at the maximum intensity and that ordinary rays polarized in the direction perpendicular to the direction H generate diffracted light of zero order and diffracted light of first order at a diffraction intensity ratio (spectral ratio) of 2:1. Such optical characteristics are obtained by properly adjusting the refractive indices and film thicknesses of the grooves 121 and the projections 122, More specifically, a phase difference Ø caused by the grooves 121 and the projections 122 is calculated from a desired diffraction intensity ratio for extraordinary rays and ordinary rays. The phase difference Ø in equations (1) and (2) shown below is substituted with the calculated value to obtain the thickness d of the projections 122 and the depth d1 of the grooves 121.

$$Øe=(2π/λ)((ne-1) \times d1 + (ne-nt) \times (d-d1)) \quad (1)$$

$$Øo=(2π/λ)(n0-1) \times d1 \quad (2)$$

wherein Øe: phase difference for extraordinary rays
Ø0: phase difference for ordinary rays
λ: wavelength
d: film thickness at projections 122
d1: depth of grooves 121
ne: refractive index of projections 122 for extraordinary rays
n0: refractive index of projections 122 for ordinary rays
nt: refractive index of grooves 121

For example, in preparing the polarization separating element 1 for use as a beam splitter of a polarization-dependent light pickup device, in order for incident extraordinary rays having a wavelength of 650 nm to maximize diffracted light of first order and for incident ordinary rays to have a zero order to first order diffraction intensity ratio of 2:1, the phase difference Øe for extraordinary rays is 180°, and that for ordinary rays is 96°. Substituting 1.8 for ne and 1.5 for n0=nt, d=505 nm, and d1=347 nm.

Process for Producing Polarization Separating Element 1

The polarization separating element 1 is produced according to the procedures shown in FIGS. 3A through 3D. In the step shown in FIG. 3A, an orientation film 13 comprising PET is formed on the surface 101 of a glass substrate 10. PET is dissolved in a small amount of a fluorine-containing alcohol solvent to saturation, and the solution is 10-hold diluted with a chlorine-containing diluent. The diluted solution, from which solid matter has been removed, is applied to the surface 101 of the glass substrate 10 having optically isotropic properties. The thickness of the PET film is, for example, 100 to 200 nm. The surface of the PET film is rubbed in a predetermined direction of orientation with cloth, such as nylon, rayon or polyester, to make the PET film into an orientation film 13.

Figure 3A:
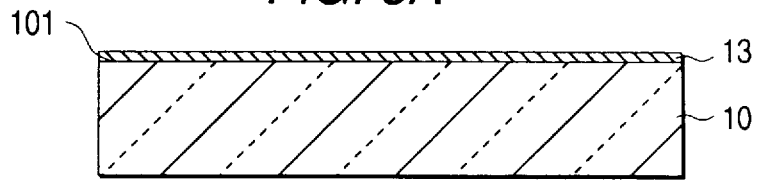
FIGS. 3A to 3D are each a cross section illustrating a process for producing the polarization separating element of FIG. 1.
Figure 3B:
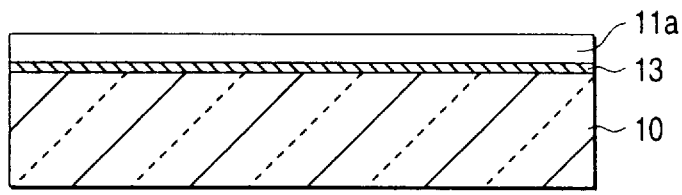

In the step shown in FIG. 3B, a diacetylene monomer 11a providing a polydiacetylene derivative represented by formula (I) is deposited on the orientation film 13 by vacuum evaporation. While being deposited, the diacetylene monomer 11a is orientated spontaneously along the direction of rubbing. In this embodiment, the vacuum evaporation is carried out under the following conditions to form a diacetylene monomer film whose thickness satisfies equation (1): resistive heating temperature of 124° C., rate of deposition of 0.05 to 0.5 nm/sec, and pressure of 1 to 4 mPa.

Figure 3C:
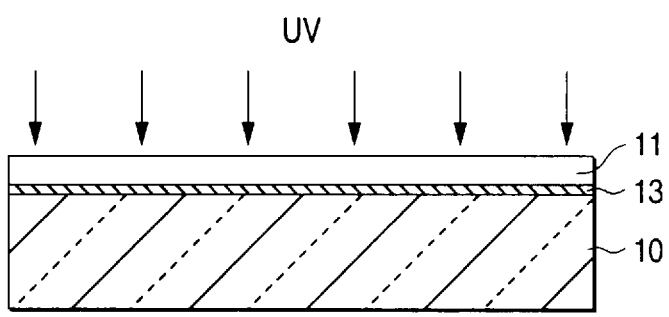

As shown in FIG. 3C, the entire surface of the diacetylene monomer film 11a is irradiated with ultraviolet light to polymerize the diacetylene monomer 11a. The UV irradiation is carried out by, for example, using a ultrahigh pressure mercury lamp at an illuminance of, e.g., about 2 mW/cm$^{-2}$ for about 2 minutes.

Figure 3D:
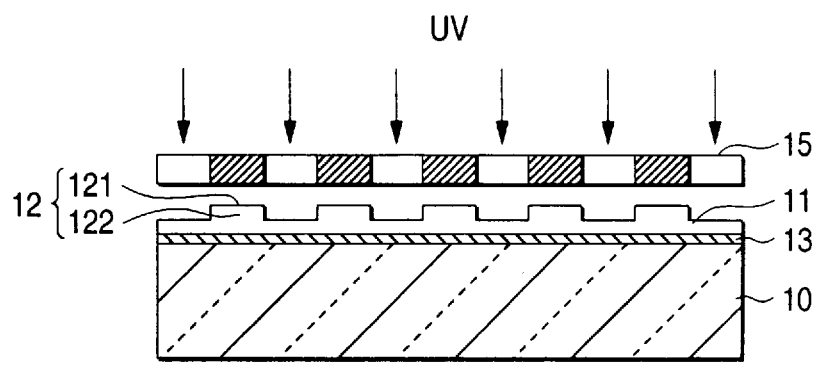

FIG. 3D shows a step of selectively irradiating the polydiacetylene derivative film 11 to form a periodic grating 12. Selective UV irradiation is achieved by irradiating the polydiacetylene derivative film 11 through a photo mask 15 (chromium mask) having a diffraction grating pattern with collimated ultraviolet rays. The UV irradiation can be carried out by using an ultrahigh pressure mercury lamp at an intensity of about 20 mW/cm$^{-2}$ for an exposure time of about 1 hour. On UV irradiation, the molecular chains of the polydiacetylene derivative in the irradiated area of the film 11, which corresponds to the light transmitting area of the photo mask 15, are cut to cause hue change and shrinkage to form grooves 121. On the other hand, the non-irradiated area, which corresponds to the light shielding area of the photo mask 15 undergoes neither hue change nor shrinkage to provide projections 122. There is thus produced the polarization separating element 1 shown in FIG. 1.

Light Pickup Device Using Polarization Separating Element 1

Figure 4:
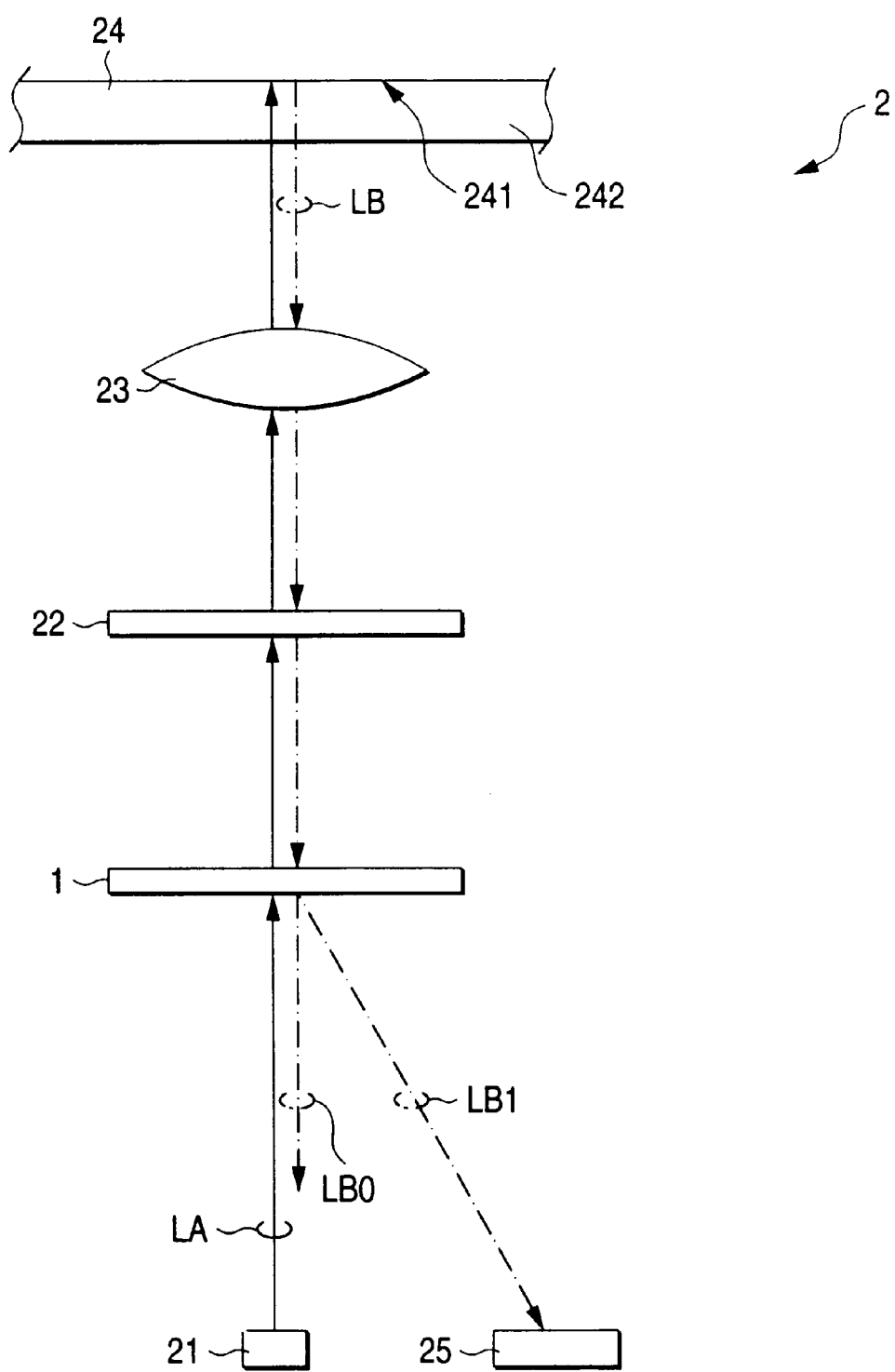
FIG. 4 is a schematic view of a light pickup device in which the polarization separating element of FIG. 1 is used as a beam splitter.

The polarization separating element 1 can be used as, for example, a beam splitter of a polarization-dependent light pickup device 2 shown in FIG. 4, which is used for an optical disk such as CD, DVD, MO, etc.

The light pickup device 2 of FIG. 4 has the polarization separating element 1, a quarter-wave plate 22, and an objective lens 23 in this order from a laser light source 21 (semiconductor laser) toward an optical disk 24. Laser rays LA emitted from the laser light source 21 are ordinary rays and are diffracted by the polarization separating element 1 into diffracted light of zero order and diffracted light of first order at an intensity ratio of 2:1 (conditions indicated by point A and point B in FIG. 2). The diffracted light of zero order is converted to circular polarization while passing through the quarter-wave plate 22 and then passes through the objective lens 23 to be condensed to a beam on the recording surface 241 of the optical disk 24.

The condensed laser beam is reflected on the recording surface 241 of the optical disk 24. Passing through the objective lens 23 and the quarter-wave plate 22, the reflected light LB from the optical disk 24 is led to the polarization separating element 1.

Because the laser light emitted from the laser light source 21 has once passed through the polarization separating element 1 as ordinary rays and passed through the quarter-wave plate 22 twice by the time when it again enters the polarization separating element 1 as reflected light LB, the reflected light LB after having passed through the polarization separating element 1 is extraordinary rays Therefore, the polarization separating element 1 generates diffracted light of first order LB1 having the maximum intensity (the condition corresponding to point C in FIG. 2), generating little diffracted light of zero order LB0 (the condition corresponding to point D in FIG. 2). As a result, the diffracted light of first order LB1 reaches a receptor 25, and the data recorded on the optical disk 24 are detected based on the amount of light having entered the receptor 25.

While the above explanation has been made on the premise that the substrate 242 of the optical disk 24 does not show birefringence, some of optical disks exhibit large birefringence. In the worst case, birefringence of the substrate 242 acts like a halfwave plate on the laser light, in which the reflected light LB that should have been converted to extraordinary rays before entering the polarization separating element 1 enters the polarization separating element 1 as ordinary rays. Where a conventional perfect polarization separating element is used in such a case, the reflected light LB does not at all reach the receptor 25. Since a perfect polarization separating element does not generate diffracted light of first order from ordinary rays as indicated by the double-dotted line L3 in FIG. 2 (the condition corresponding to point E), the reflected light LB which has entered the polarization separating element as ordinary rays by the action of the birefringence of the substrate 242 comes out of the polarization separating element as unchanged and fails to reach the receptor 25.

To the contrary the polarization separating element 1 of the invention generates diffracted light of zero order LB0 and diffracted light of first order LB1 even from ordinary rays at an intensity ratio of 2:1 (the conditions corresponding to point A and point B in FIG. 2). In other words, even if the reflected light LB is ordinary rays, part of the reflected light LB reaches the receptor 25 without fail.

It is more effective to use a wave plate that corrects the phase difference in conformity to the degree of birefringence of the optical disk 24.

In the light pickup device 2 using the partial polarization separating element 1 as a beam splitter, part of the reflected light LB always reaches the receptor 25 even when the optical disk 24 itself has large birefringence. Therefore the information recorded on an optical disk exhibiting large birefringence can be reproduced with no problem. Moreover, the grating 12 of the polarization separating element 1 is designed to generate maximum diffracted light of first order from extraordinary rays so that the amount of light entering the receptor 25 is maximized when the reflected light LB is not affected by the birefringence of the optical disk 24.

In the present invention, a polydiacetylene derivative film is used for formation of the partial polarization separating element 1. Because the polydiacetylene derivative film 11 can be prepared easily by vacuum deposition and UV polymerization, and also because the material itself is inexpensive, the polarization separating element 1 can be produced more easily and economically than conventional polarization separating elements prepared from lithium niobate. The polydiacetylene derivative film 11 can have a small thickness owing to its high degree of birefringence, which offers an advantage in producing a compact polarization separating element. The polydiacetylene derivative film 11 can be formed with planar uniformity, which furnishes an advantage in producing a composite element combined with a prism, a mirror, etc.

According to the process of the invention, the polarization separating element 1 can be produced simply by irradiating a deposit layer of the diacetylene monomer 11a with ultraviolet rays and selectively irradiating the resulting polydiacetylene derivative film 11 with ultraviolet rays to vary the refractive index of the irradiated area and, at the same time, to contract the irradiated area to form grooves 121. Compared with other processes for forming an uneven pattern such as etching, the process of the invention is excellent in easiness and precision for forming a grating 12 having fine periodical grooves at a small pitch. Requiring no special equipment, the process of the invention provides the partial polarization separating element 1 at low cost.

In the above-described embodiment, deposition of the diacetylene monomer 11*a* is preceded by formation of a polymer film, such as a PET film, on the optically isotropic substrate 10. The polymer film is subjected to rubbing treatment to form the orientation film 13, on which the diacetylene monomer 11*a* is deposited. The diacetylene monomer 11*a* deposited on the orientation film 13 is spontaneously orientated in the rubbing direction of the orientation film 13.

Modifications

While the polarization separating element 1 of the above-described embodiment is designed to generate diffracted light of zero order and diffracted light of first order from ordinary rays at a diffraction intensity ratio of 2:1 and to generate maximum diffracted light of first order from extraordinary rays, the diffraction intensity ratio is by no means limited to the above specific ratio as long as the polarization separating element exhibits such partially polarizing properties that both diffracted light of zero order and diffracted light of first order are generated from one of ordinary rays and extraordinary rays and that at least diffracted light of first order is generated from the other incident rays.

While in the above embodiment the polarization separating element 1 is so constructed that the light emitted from a laser light source enters the polarization separating element 1 as ordinary rays, the polarization separating element 1 can be applied to an optical system in which the light emitted from a laser light source enters the polarization separating element as extraordinary rays. In this case, the polarization separating element is designed to generate diffracted light of zero order and diffracted light of first order from extraordinary rays at a diffraction intensity ratio of 2:1 and to maximize the diffracted light of first order from ordinary rays.

Where the polarization separating element of the invention is used as a beam splitter of a polarization-independent light pickup device, the polarization separating element can be designed to have a first order to zero order diffraction intensity ratio of 0.5 (diffracted light of zero order:diffracted light of first order=2:1) for one of incident ordinary rays and incident extraordinary rays and a first order to zero order diffraction intensity ratio of 0.5 or higher (diffracted light of zero order:diffracted light of first order=2:1 or more) for the other incident rays. Where the polarization separating element so designed is used as a beam splitter of a polarization-independent light pickup device, the amount of light entering the receptor tends to increase when laser light is influenced by the birefringence of an optical disk. The light pickup device having such construction achieves greater efficiency in utilizing laser power than a conventional polarization-independent light pickup device.

An antireflective coating, a protective coating for protecting the polydiacetylene derivative film 11 against mechanical damage, or a thin film having both an antireflective function and a protective function can be provided on the surface of the polydiacetylene derivative film 11 forming the grating 12. The antireflective function reduces an optical loss caused by the polarization separating element, and the protective function protects the polydiacetylene derivative thin film 11 having low mechanical strength, thereby to improve reliability of the polarization separating element 1.

The polarization separating element according to the present invention is characterized by the periodic grating having partially polarizing properties which is formed of a polydiacetylene derivative film. The polydiacetylene derivative film can be formed very easily without requiring special equipment so that the polarization separating element having partially polarizing properties can be produced at low cost. Having extremely high birefringence, the polydiacetylene derivative film is capable of providing a very thin element having partially polarizing properties. The polydiacetylene derivative film can be formed with planar uniformity simply by ultraviolet polymerization after vacuum evaporation. Since the polydiacetylene derivative film forms grooves and projections having different refractive indices upon being selectively irradiated with ultraviolet rays, a grating having periodic grooves at a small pitch can be produced at lower cost with higher precision than by such a process as etching.

What is claimed is:

1. A polarization separating element having a partially polarizing property comprising:

an optically isotropic substrate;

a thin film comprising a polydiacetylene derivative which is formed on at least one of the light incident surface and the light emergent surface of said optically isotropic substrate;

a grating having periodic grooves and two hues, said grating being formed on said thin film and having the partially polarizing property of generating first order diffracted light from one of ordinary and extraordinary rays, and generating both zero order and first order diffracted light from the other of ordinary and extraordinary rays.

2. A polarization separating element having a partially polarizing property according to claim 1, wherein said periodic grooves of said grating are formed by selective irradiation of said thin film with ultraviolet rays.

3. A polarization separating element having a partially polarizing property according to claim 2, wherein said grating is designed to maximize generation of diffracted light of first order from either incident light.

4. A polarization separating element having a partially polarizing property according to claim 3, wherein said thin film has provided thereon a surface coating having an antireflective function and a protective function for protecting said thin film from mechanical damage.

5. A polarization separating element having a partially polarizing property according to claim 1, wherein said grating is designed to generate diffracted light of first order from either incident light at a diffraction intensity ratio of 0.5 or higher to diffracted light of zero order and to generate diffracted light of first order from the other incident light at a diffraction intensity ratio of 0.5 to diffracted light of zero order.

6. A polarization separating element having a partially polarizing property according to claim 5, wherein said thin film has provided thereon a surface coating which is an antireflective coating and a protective coating for protecting said thin film from mechanical damage.

7. A process for producing a polarization separating element with a partially polarizing property having an optically isotropic substrate and a thin film comprising a polydiacetylene derivative which is formed on at least one of the light incident surface and the light emergence surface of the optically isotropic substrate, comprising the steps of:

depositing a diacetylene monomer on at least one of the light incident surface and the light emergence surface of the optically isotropic substrate by vacuum evaporation;

irradiating the diacetylene monomer with ultraviolet rays to polymerize the diacetylene monomer to form a thin film comprising a polydiacetylene derivative; and selectively irradiating the thin film with ultraviolet rays to form a grating having periodic grooves and two hues.

8. A process for producing a polarization separating element with a partially polarizing property according to claim 7, wherein deposition of the diacetylene monomer is preceded by forming a film on at least one of the light incident surface and the light emergence surface of the optically isotropic substrate and rubbing the film to form an orientation film on which the diacetylene monomer is to be deposited.

9. A light pickup device in which laser light emitted from a laser light source passes through a polarization separating element, with partially polarizing property a quarter-wave plate, and an objective lens to be condensed on an optical disk, and the light reflected on the optical disk again passes through the objective lens, the quarter-wave plate, and the polarization separating element to be led to a receptor, wherein said polarization separating element comprises:

an optically isotropic substrate;

a thin film comprising a polydiacetylene derivative which is formed on at least one of the light incident surface and the light emergence surface of the optically isotropic substrate; and a grating formed on said thin film, said grating having periodic grooves and two hues, and being capable of generating both diffracted light of zero order and diffracted light of first order from the laser light emitted from the laser light source and generating at least diffracted light of first order from the light reflected from the optical disk.

10. A light pickup device according to claim 9, wherein said grating is designed to maximize generation of diffracted light of first order from the light reflected on the optical disk.

11. A light pickup device according to claim 9, wherein said thin film forming said grating has provided thereon a surface coating having an antireflective function and a protective function for protecting said thin film from mechanical damage.

12. A light pickup device according to claim 9, wherein said grating is designed to generate diffracted light of first order from the laser light emitted from the laser light source at a diffraction intensity ratio of 0.5 to diffracted light of zero order and to generate diffracted light of first order from the light reflected on the optical disk at a diffraction intensity ratio of 0.5 or higher to diffracted light of zero order.

* * * * *